Figure 3:
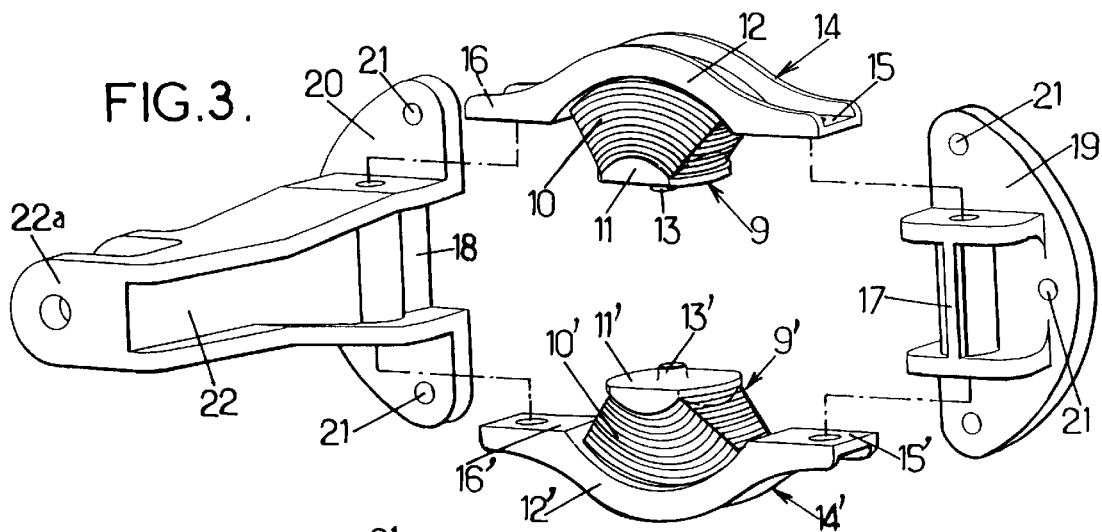

United States Patent
Certain et al.

[19]

[11] Patent Number: 6,113,352
[45] Date of Patent: Sep. 5, 2000

[54] HINGELESS ROTOR WITH PRECOMPRESSED HALF-BEARINGS SUPPORTING BLADE ROOT OVERSLEEVES ON TORSIONABLE BLADE ROOT STRIPS

[75] Inventors: Nicolas Pierre Georges Certain, Aix-en-Provence; Jean-Pierre Jalaguier, Vitrolles; Edwin Ortega, Marseilles, all of France

[73] Assignee: Eurocopter, France

[21] Appl. No.: 09/299,823

[22] Filed: Apr. 26, 1999

[30] Foreign Application Priority Data

Apr. 29, 1998 [FR] France .................................. 98 05389

[51] Int. Cl.[7] ....................................................... B63H 1/06
[52] U.S. Cl. ..................... 416/134 A; 416/104; 416/163; 416/164; 416/168 R; 416/214; 416/207
[58] Field of Search ............................... 416/134 A, 104, 416/163, 164, 168 R, 214 R, 222, 220 A, 245 A, 141, 26, 207, 208

[56] References Cited

U.S. PATENT DOCUMENTS 4,053,258  10/1977  Mouille .

4,244,677  1/1981  Noehren et al. .

FOREIGN PATENT DOCUMENTS 0 097 885  1/1984  European Pat. Off. .
0 315 962  5/1989  European Pat. Off. .
0 451 084  10/1991  European Pat. Off. .

*Primary Examiner*—Edward K. Look
*Assistant Examiner*—Hermes Rodriguez
*Attorney, Agent, or Firm*—Piper Marbury Rudnick & Wolfe

[57] ABSTRACT

Each blade of the rotor has a rigid root oversleeve connected to a torsionable and flexible root strip by two laminated, spherical support half bearings, fixed by their outer frame with double rigid horns the lateral ends of which facing each other on each side of the strip and half bearings are clamped towards each other and against struts so as to allow a significant, calibrated pre-compression of the half bearings. The double horns and/or struts are fixed axially to the oversleeves by fixing elements distinct from the compression means of the double horns on the struts and perpendicular to these compression horns on the struts and perpendicular to these compression elements. One of the struts, possibly in a single piece with one double horn, is also in a single piece with a pitch lever.

14 Claims, 3 Drawing Sheets

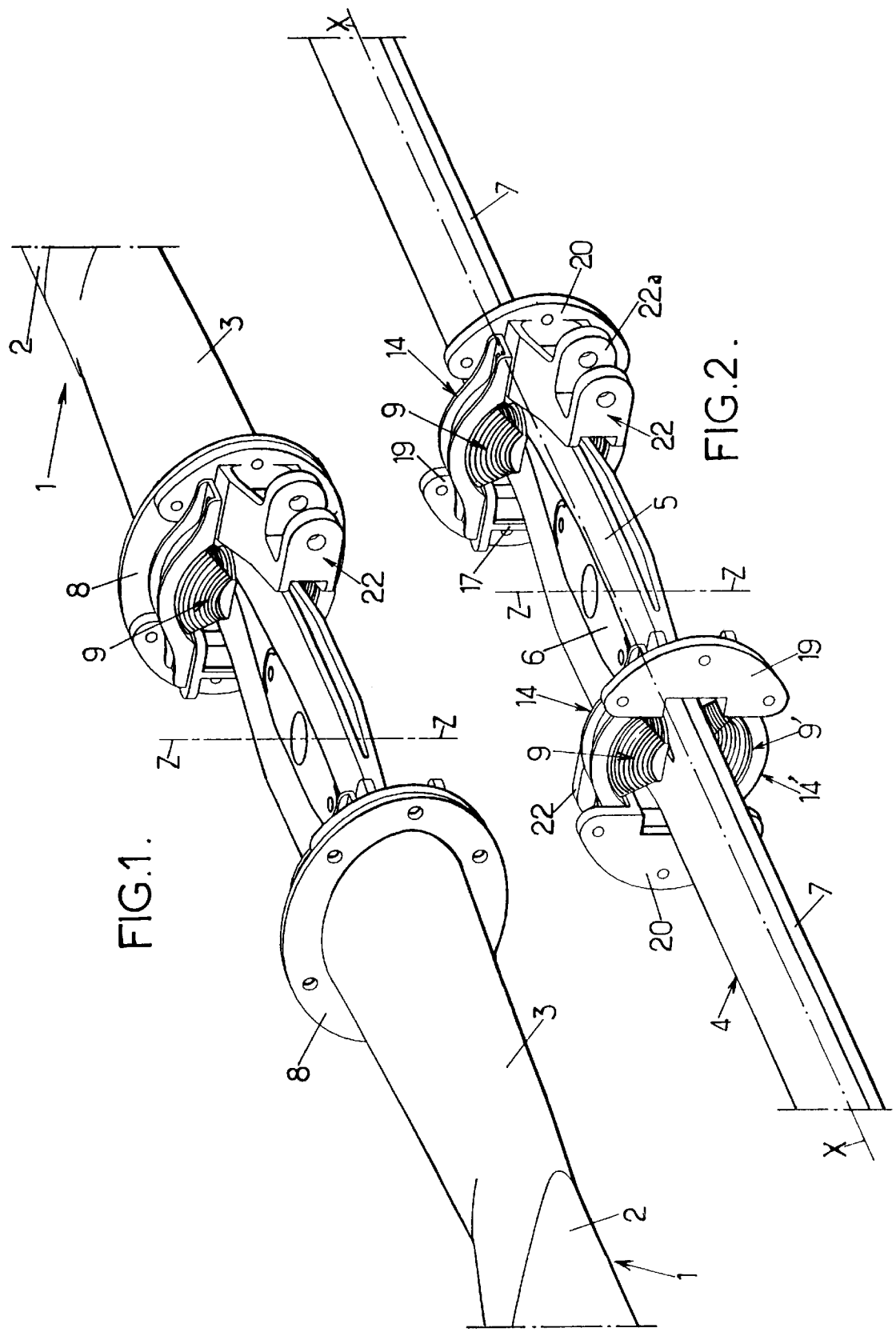

HINGELESS ROTOR WITH PRECOMPRESSED HALF-BEARINGS SUPPORTING BLADE ROOT OVERSLEEVES ON TORSIONABLE BLADE ROOT STRIPS

The invention relates to a so-called "hingeless" type of rotor, being able to be a main (lifting) or rear (anti-torque) rotor, for a rotor aircraft, and the invention concerns in particular a helicopter rear rotor.

Numerous versions of hingeless rotor are known, of the type including:

a hub, intended to be rotated around a rotor axis, and at least two blades, each of which is, on the one hand, connected to the hub by a root part including at least one strip torsionable around a longitudinal pitch change axis of the blade, and flexible at least in flapping in a direction substantially perpendicular to the pitch axis and substantially parallel to the rotor axis, and, on the other hand, provided with a torsionally rigid blade root oversleeve, which is torsionally integral with the blade and the torsionable strip around the pitch axis, on the side of the outer axial part of the oversleeve relative to the hub and along the pitch axis, whereas the internal axial part of the oversleeve surrounds the strip without contact, to which the oversleeve is connected by two spherical, laminated support half bearings, substantially concentric on the pitch axis, and each comprising a stack of layers of alternatively rigid and elastomer sphere portions between two rigid frames, one of which is an inner radial frame, relative to the pitch axis, which is held supported against one face of the strip, and the other of which is an outer radial frame fixed to the oversleeve, which supports a pitch lever projecting outwards from the oversleeve.

The pitch lever is connected to a pitch control rod, which, in general, is operated substantially in the direction of the rotor axis, by an activating mechanism connected to the flight controls activated by the pilot, in order to control the pitch of the rotor blades.

Each blade can be individually connected to the hub by its root part, connected to a blade spar or spars, or constituting an internal radial extension of this or these spar(s), in particular on a main hingeless rotor.

But the root part of each blade can also be a portion of a strip common to two opposite blades, for which this strip constitutes or extends the spars, as described in U.S. Pat. No. 4,053,258 and U.S. Pat. No. 4,244,677 relative to helicopter anti-torque rotors. In such a rotor, the strip, which forms the spars of two opposite blades, and each of which is surrounded by a streamlined shell to form the corresponding blade, is built in by its central part between two hub plates fixed on a rotor shaft, or hinged to pivot around a swivel arm in an end clevis of the rotor shaft, as on the rear rotor of the "Ecureuil" helicopter marketed by the AEROSPATIALE Company and then by the EUROCOPTER Company.

In the hingeless rotors of the type mentioned above, and as described, for example, in U.S. Pat. No. 4,053,258 and U.S. Pat. No. 4,244,677, the pitch control of the blades is obtained by the torsion of the torsionable and flexible strip over a fraction of its length, in the root of each blade in the hub. Each torsionally rigid oversleeve transmits the pitch control of the corresponding blade between the pitch lever, acted upon by the corresponding pitch control rod, and the blade. The movement of the pitch rod actually results in a torsion of the corresponding torsionable strip, and therefore a rotation of the blade around its pitch axis, due to the spherical and concentric, laminated support half-bearings, installed between the oversleeve and the torsionable strip in the root part of the blade, with the inner radial frames of the half bearings maintained directly supported against the faces of the blade as proposed for example in U.S. Pat. No. 4,244,677, or with fixing of the oversleeve of the half-bearings on the hub, which holds the strip, as proposed in U.S. Pat. No. 4,053,258 and on the "Ecureuil" helicopter, so that the support half-bearings take up the shearing force coming from the pitch control rod, hinged to the pitch lever in a point relatively eccentric relative to the blade pitch axis, since located outside the oversleeve.

The versions proposed by U.S. Pat. No. 4,053,258 and U.S. Pat. No. 4,244,677 are inexpedient for maintenance purposes because the inspections and operations on the laminated half-bearings are made difficult due to the fact of their mounting inside the oversleeves. On the "Ecureuil" helicopter, the mounting of the laminated half-bearings axially inside (along the pitch axis relative to the hub centre) a rigid blade root flange, at the inner axial end of the oversleeve and supporting the pitch lever as well as balancing weights, allow this drawback to be remedied, but have another drawback, connected to the fact that the rigid outer frames of the half-bearings are fixed to this rigid flange by axial screws (parallel to the pitch axis), so that the pre-compression during mounting of the half-bearings is limited to a low value. This low pre-compression during mounting of the laminated half-bearings causes these components to have an inadequate life span.

U.S. Pat. No. 4,244,677 proposes a pre-compression, before mounting on the blade, of the laminated half-bearings, which is ensured, for each of them, by a central screw passing through a cavity made in the central part of the alternate rigid and elastomer layers stack and clamping the two rigid frames one to the other, perpendicularly to the pitch axis. Then, the pre-compression screw tool is removed after installing each half-bearing in the corresponding oversleeve by sliding parallel to the pitch axis until the inner frame is locked in a U groove of a support connected to one face of the strip by an elastomer layer, and fixing its outer frame by screwing in the oversleeve. This version allows having a significant compression of the laminated half-bearings, but without calibration of this compression, and it removes the central zone in the laminated half-bearings which is important for the optimum take up of the flapping forces.

The problem at the basis of the invention is to propose a mounting architecture of the laminated spherical support half-bearings of each oversleeve on the corresponding torsionable strip, for the take up of flapping forces, which allows a significant and calibrated pre-compression of these laminated half-bearings, without particular tooling.

Another aim of the invention is to propose a rotor of the type defined above, in which the mounting of the laminated half-bearings allows a de-coupling between the operation of putting the two laminated half-bearings of each blade into compression and the operation of take up of the pitch moment of this blade.

Another object of the invention is to allow an optimal sizing of the laminated half-bearings without removal of their central zone, which is essential for the take up of the flapping forces, and their mounting in an easily accessible structure and limiting the number of parts, and allowing in this way savings in manufacturing, mounting and maintenance.

In a general way, the object of the invention is to propose a rotor of the type explained above which is more suitable than those known for the various practical requirements.

To this end, the rotor according to the invention, of the type explained above, is characterised in that each of the two outer rigid frames of the support half-bearings is respectively integral with one of two double rigid horns extending, transversely to the strip, on both sides of this strip and the half-bearings, in such a way that the ends facing one another on the two double horns, on each side of the strip and the half-bearings, are compressed towards each other and against respectively one of two struts placed between said facing ends of said double horns, so as to ensure a calibrated compression pre-stress of the laminated half-bearings.

Such a version allows a pre-stress which can be significant with the help of means placed on the sides of the laminated half-bearings, without having to remove their central part, and all being able to remain accessible at the internal axial end of an oversleeve.

In a simple advantageous way, the compression of the two double horns is ensured with the help of removable threaded fixing spindles which are engaged in aligned bores passing through the struts and the facing ends of the double horns, along a direction substantially perpendicular to the strip.

In order to reduce the size of the double horns and the associated struts, and therefore to reduce their weight as well as that of the associated compression means, one at least of the double horns, but preferably each of them, is arched in a plane transverse to the pitch axis and has its concavity turned towards this pitch axis.

In order to limit the number of parts, and to improve the pitch control kinematic chain, it is moreover to advantage that one of the struts is integral with the pitch lever, and preferably in a single piece with this latter. In this case, in order to decrease the pitch-flapping coupling, it is moreover to advantage that the pitch lever also projects towards the hub, substantially parallel to the pitch axis.

In order to further limit the number of parts, it is also to advantage that one at least of the struts is integral with one of the double horns and preferably in a single piece with this latter. This corresponds to two solutions, in one of which a strut is in a single piece with a double horn and preferably also with the pitch lever, whereas the other strut is an independent part, while in the second solution, the two struts are in a single piece with the same double horn, on which the other double horn is pre-compressed during mounting.

But it is also possible that each of the two struts are respectively integral with one of the two double horns, and preferably in a single piece with this double horn.

In these different layouts, one at least of the outer rigid frames, and preferably each of them, is fixed against the corresponding double horn by removable fixing means which are distinct from the means of compression of the double horns towards each other and against the struts, and which are preferably substantially parallel to the pitch axis, to allow to advantage a de-coupling between the operations of putting the half-bearings into compression and taking up the blade pitch moment.

To this end, and for a good accessibility to the internal axial end of the corresponding oversleeve, the fixing of at least one rigid outer frame, and preferably of each of them, onto the corresponding double horn and/or the fixing of this double horn against a rigid flange at the internal axial end of the oversleeve is ensured with the help of fixing means, such as screws, which are substantially parallel to the pitch axis.

In another version, one at least of the outer rigid frames of the half-bearings, but preferably each of them, is in a single piece with the corresponding double horn, in which case the mounting is facilitated if one at least of the struts, and preferably each of them, comprises at least one substantially radial flange, relative to the pitch axis, for the fixing to a rigid flange at the internal axial end of the oversleeve by removable fixing means, such as screws, which, in this case also, are to advantage substantially parallel to the pitch axis.

The de-coupling between the operations of putting the half-bearings into compression and the taking up of the blade pitch moment is thus also ensured in this second layout.

To facilitate the installing of the half-bearings and their being held supported against the strip by their inner rigid frame, it is advantageous that each of the inner rigid frames comprises at least one centering stud projecting towards the pitch axis and being housed in a corresponding bore in the opposite face of the strip.

When the rotor blades are arranged in at least one pair of opposite blades with a common root strip which extends from one blade into the other, it is possible, as known in the prior art, that the central part of the strip is fixed between two parts of the hub integral with a rotor shaft or pivoting mounted around a swivel arm axis in an end clevis of the rotor shaft. But it is also possible that, for each pair of opposite blades, a rigid hub core is embedded between two strip halves separated from each other in the strip part extending on either side of the rotor axis, between the half-bearings of these two opposite blades. This core and the strip parts which surround it can be fitted between two hub plates, one of which is integral with the rotor shaft or is pivoting mounted on the rotor shaft, several pairs of opposite blades being able to be possibly superposed by the hub plates between which their hub cores and the central parts of their corresponding strips are fitted, and the cores and plates thus superposed being able to be passed through by a bore of sufficiently significant diameter for the passage of parts of the collective pitch control chain of the blades of a rear rotor through the interior of the rotor shaft.

But this control can also be ensured through the outside of the rotor shaft and the hub.

Figure 4:
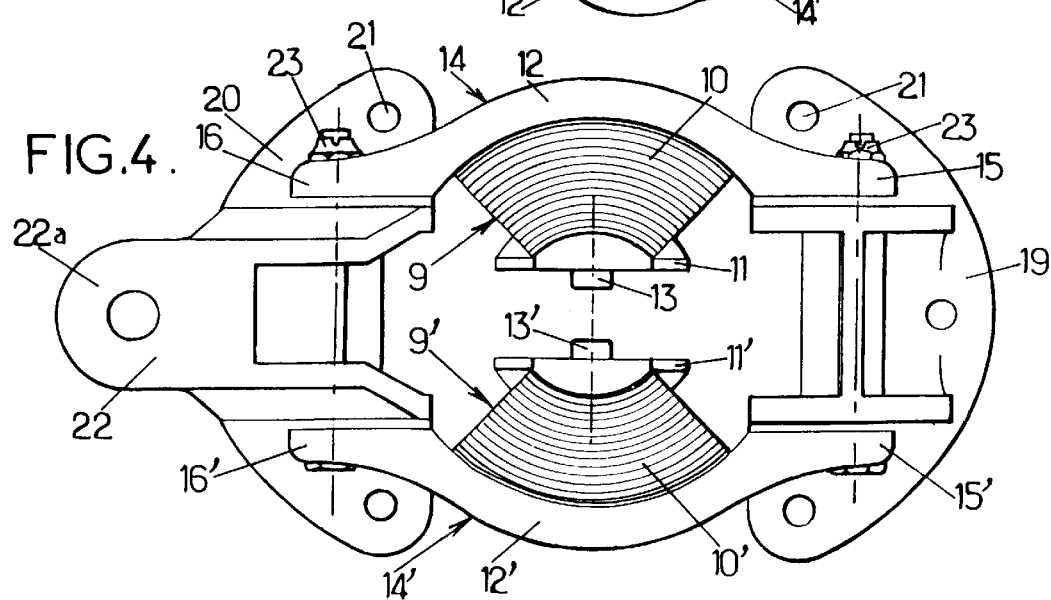
Figure 5:
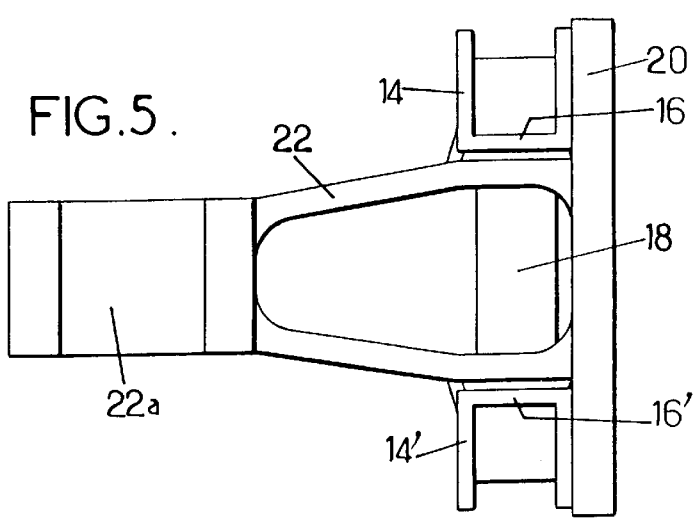
Figure 6:
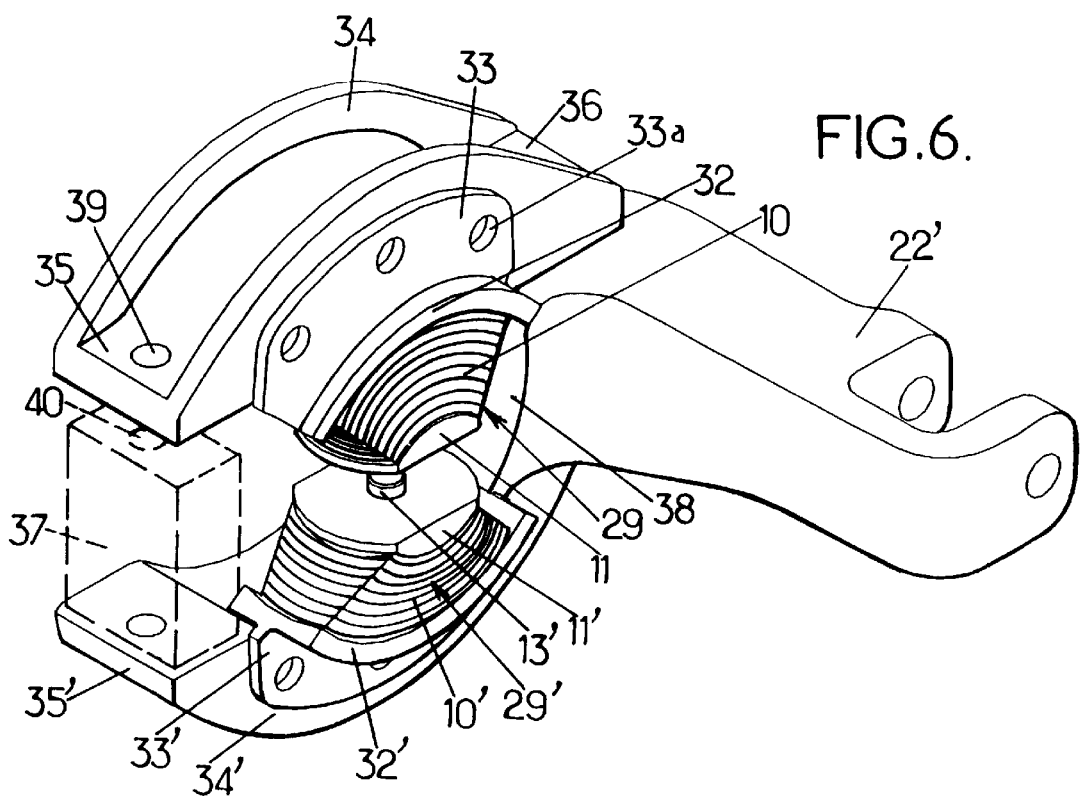
Figure 7:
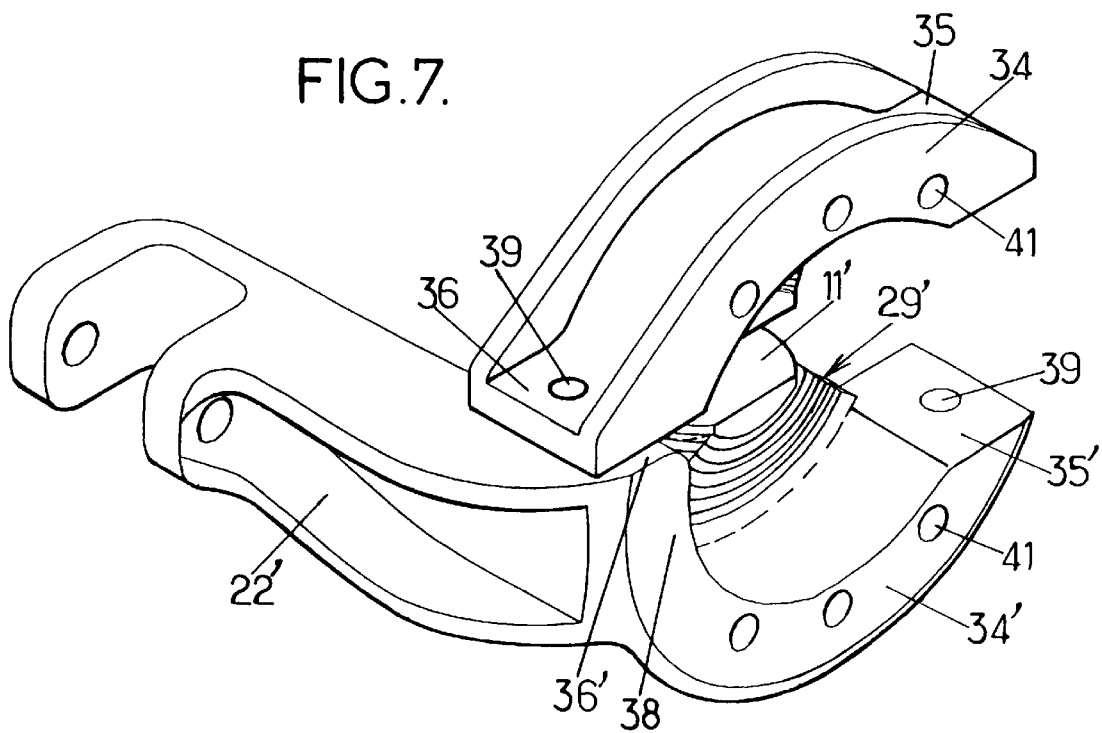

Other advantages and characteristics of the invention will arise out of the description given below, as a non-restrictive example, of version examples described by reference to the appended drawings in which:

FIG. 1 is a partial perspective view of a helicopter rear rotor with two opposite blades according to the invention, FIG. 2 is a similar view to FIG. 1 showing the two blade rear rotor without blade root oversleeve nor streamlined shell of the main blade sections of the blades, and leaving visible the mounting of the half-bearings and their pitch levers on the torsionable and flexible strip common to the two blades, FIG. 3 is an exploded perspective view of the mounting of the half-bearings, of the two double horns, of the two struts with fixing flange, and of the pitch lever which are used for each blade, FIGS. 4 and 5 show end and side views of the mounting of FIG. 3, and FIGS. 6 and 7 are diagrammatic perspective views of a second mounting example similar to that of FIGS. 3 to 5.

The helicopter two blade rear rotor of FIGS. 1 and 2 includes two diametrically opposite blades 1 relative to the rotor rotational axis Z—Z, and substantially in the longitudinal extension (along the span) one of the other on either side of this axis Z—Z. The blades 1 each have an aerodynamic contour main blade section, shown only in its part next to the blade root arranged, on each blade 1, as a tubular oversleeve 3, torsionally rigid around the longitudinal pitch change axis X—X of the blades 1 (see FIG. 2). The oversleeve 3 has a substantially general truncated shape, with an oval or elliptical transverse section the major axis of which is directed substantially perpendicularly to the axes Z—Z and X—X and diverging towards the axis Z—Z.

In a known way (and not shown in the figures), the main blade sections 2 are each defined by a rigid, streamlined shell, metallic or most often composite on modern helicopters, and in this latter case constituted with a stratified coating of at least two generally crossed layers, of reinforced fibre material (generally of glass, carbon or aramid) compressed by a synthetic rigidifying resin, the shell 2 enclosing a spar, extending along the span of the blade 1 and with which the shell 2 is integral, as well as filling elements, for example of foam, generally placed between the spar and the trailing edge of the shell 2.

On the composite blades 1, the blade root oversleeve 3 is made by a reinforced extension of the composite structure of the shell 2, the reinforcement being ensured by stratification of a greater number of layers of fibre material than in the shell 2.

The spars of the two blades 1 are constituted by the axial end portions (along the longitudinal axis X—X) of a single strip 4, elongated in the direction of the span of the blades 1, with a transverse flattened rectangular section (perpendicularly to its longitudinal axis which is the longitudinal pitch change axis X—X of the blades 1) the largest dimension of which, or span of the strip 4, is substantially perpendicular to the axes of the rotor Z—Z and the pitch X—X of the blades 1, and appreciably greater than its small dimension, or thickness of the strip 4, along the axis Z—Z.

This strip 4, which is torsionable around its longitudinal axis X—X for the pitch control of the blades 1, and flexible perpendicularly to its two large faces which are substantially perpendicular to the rotor axis Z—Z, for the flapping of the blades 1, has its central part 5 integral with the hub, only one hub core 6 of which has been shown. This metallic hub core 6, of substantially oval shape in plan, is embedded between the two halves, separated from each other, of the central part 5 of the strip 4 subdivided along its longitudinal axis X—X, and this central strip part 5 and the hub core 6 are clamped between two superposed hub plates (not shown), fixed to each other and to the core 6 by bolts parallel to the axis Z—Z, which can also and simultaneously fix the hub thus constituted at the end of a rotor shaft (not shown) rotated around the axis Z—Z and itself rotating the hub (5–6) and the blades 1 around this axis Z—Z.

In the case of composite blades 1, the thin strip 4 is constituted in a known way from a bundle of uni-directional rovings of reinforced fibres with high mechanical strength, for example of carbon or aramid, agglomerated by a rigidified resin, and this strip 4 extends over all the rotor span.

The streamlined shells 2 of the blades 1, fitted on the spars formed by the end portions of the strip 4 and fixed to the spars by gluing or moulded around the spars and fixed to these latter by hot polymerisation after moulding, are torsionally integral around the pitch axis X—X, with the spars and the outer end parts, along the axis X—X and relative to the centre of the hub (5–6), of the oversleeves 3, i.e. with their most tightened ends, adjacent to the shells 2. Thus, between the end parts of the strip 4 constituting the spars of the blades 1 and its central part 5 integral with the hub, the strip 4 constitutes root parts 7 of the blades 1 to the hub (5–6), these root parts allowing the variations of the pitch of the blades by torsion around the axis X—X and the flapping of the blades 1 by flexing perpendicularly to the large faces of the strip 4. Furthermore, the root parts 7 are surrounded without contact by the oversleeves 3, the internal axial end of which (towards the axis Z—Z) of each is integral with a light alloy flange 8, drilled with axial bores (parallel to the axis X—X) for the fixing by axial bolts to a mounting including, for each blade 1, two support half-bearings 9 and 9' for the oversleeve 3 on the root part 7 of the strip 4, for the take up of flapping forces, and a pitch lever 22, hinged to a pitch rod of a collective pitch control mechanism of the blades 1, which is not shown because its structure is well known.

The mounting of the support half-bearings 9 and 9' and of the pitch lever 22 is at present described by reference also to FIGS. 3 to 4. This mounting appears also in FIG. 2, after removing the oversleeves 3, which leaves visible the torsionable and flexible root parts 7 of the strip 4.

The two half-bearings 9 and 9' are spherical, laminated half-bearings and concentric around the same centre located on the axis X—X. Each half-bearing 9 or 9' comprises a central part 10 or 10' constituted by an alternate stack of elastomer and rigid dish layers, for example metallic, in the shape of sphere parts, this central laminated part 10 or 10' being vulcanised between two rigid frames, for example metallic, one of which is an inner radial frame 11 or 11' (relative to the axis X—X) and the other an outer radial frame 12 or 12'. The two half-bearings 9 and 9' for each blade 1 are placed symmetrically on either side of the corresponding root part 7 of the strip 4, and are held supported by their inner frame 11 or 11' against this root part 7. To this end, each inner frame 11 or 11' comprises a cylindrical centering stud 13 or 13', projecting radially towards the axis X—X and housed in a cavity of corresponding shape made in the opposite large plane face of the strip 4, to ensure the centering during installation of the half-bearings 9 and 9' on the strip 4.

The outer frame 12 or 12' of each laminated half-bearing 9 or 9' is in a single piece with a rigid double horn 14 or 14', of which the outer frame 12 or 12' constitutes the arched central part, in a plane perpendicular to the axis X—X, so as to have its concavity towards this axis X—X, in the same direction as the concavity of the elastic and rigid layers of the corresponding laminated central part 10 or 10'. Each rigid double horn 14 or 14' is oriented transversely relative to the axis X—X, and more exactly perpendicularly to the axes X—X and Z—Z, and it is extended either side the strip 4 and the half-bearings 9 and 9' by lateral mounting brackets 15 and 16 or 15' and 16'. These mounting brackets have a support face constituted by the bottom, at the lateral ends of the double horns 14 and 14', of their transverse U section open from the side opposite to the corresponding half-bearings 9 or 9'.

For the fixing of the outer frames 12 and 12', and thus of the rigid double and thus horns 14 and 14', to the flange 8 of the oversleeve 3 of the corresponding blade 1, the mounting also includes two rigid spacers or struts 17 and 18, which are each in a single piece with a rigid flange 19 or 20, radial relative to the axis X—X, and in the shape substantially of a half-moon, drilled with axial bores 21 (parallel to the axis X—X) for fixing against the face of the corresponding flange 8 which is turned towards the axis Z—Z by axial screw-nut sets.

Furthermore, one of the struts 18 is also in a single piece with the pitch lever 22, which on the one hand projects substantially parallel to the axis X—X and towards the axis Z—Z, and on the other hand projects radially relative to the axis X—X towards the outside of the corresponding flange 8, this lever ending in an end clevis 22a in which is reanti-torquened, in a well known manner, a ball joint (not shown) for articulating the corresponding pitch rod on the pitch lever 22.

The double horns 14 and 14' have their mounting brackets 15 and 15', on the same side of the strip 4 and of the half-bearings 9 and 9', which are applied against the two opposite ends of the strut 17, and which are fixed against this latter by a screw-nut 23 set passing through aligned bores in the strut 17 and in the brackets 15 and 15', and in a similar way the double horns 14 and 14' have their mounting brackets 16 and 16', on the other side of the strip 4 and the half-bearings 9 and 9', which are clamped towards each other and fixed against the opposite ends of the strut 18, on which these brackets 16 and 16' are fixed by another screw-nut set 23, with axis perpendicular to the axis X—X and to the large faces of the strip 4, and substantially parallel to the axis Z—Z.

With regard to the flanges 8 of the oversleeves 3, the double horns 14 and 14' are thus fixed on the struts 17 and 18 axially inside the flanges 8, from the side of the axis Z—Z, and are therefore always accessible.

The mounting brackets 15 and 15' or 16 and 16' at ends opposite one another on the double horns 14 and 14', on each side of the strip 4 and of the half-bearings 9 and 9', can thus be clamped one towards the other and against one of the two struts 17 and 18 respectively placed between these brackets 15 and 15' or 16 and 16', so that the mounting of the half-bearings 9 and 9' can be ensured with a calibrated compression pre-stress of these latter, the dimension of the struts 17 and 18 between their support faces against the mounting brackets 15 and 15' or 16 and 16' being arranged to ensure the specified clamping suitable for the two half-bearings 9 or 9'.

In this mounting, it is understood that the calibrated compression operation of the two half-bearings 9 and 9', ensured by the two screw-nut sets 23 which compress the half-bearings 9 and 9' by their double horns 14 and 14' against the struts 17 and 18, is de-coupled from the operation of pitch moment take up of the corresponding blade 1, which is ensured by the axial screw-nut sets passing through the bores of the flanges 8 and the opposite bores 21 on the flanges 19 and 20 of the struts 17 and 18.

In this way this mounting allows a significant and calibrated pre-compression, and without particular tooling, of the laminated half-bearings 9 and 9' between the strip 4, on the one hand, and, on the other hand, the flange 8 of the oversleeve 3 of a blade 1, to which are fixed the rigid double horns 14 and 14' and the struts 17 and 18. Furthermore, the arrangement and orientation of the pitch lever 22 allows the pitch-flapping coupling to be reduced since its end clevis 22a is brought nearer the axis Z—Z relative to the half-bearings 9 and 9'.

A mounting has been shown in perspective in FIGS. 6 and 7 of another assembly example of two spherical, laminated half-bearings, of two rigid double horns and of two rigid struts with a pitch lever, which can be used exactly in the same conditions as that of FIGS. 3 to 5 and on the same rotor as that of FIGS. 1 and 2. In FIGS. 6 and 7, the support half-bearings 29 and 29' include spherical, laminated central parts 10 and 10' and rigid inner frames 11 and 11' with centering stud 13 and 13' which are identical to the corresponding parts of the half-bearings 9 and 9' of the example of FIGS. 3 to 5.

On the contrary, in FIGS. 6 and 7, the half-bearings 29 and 29' have a rigid outer frame 32 and 32' which is no longer in a single piece with the corresponding rigid double horn 34 or 34', but which is added onto this latter by a flange 33 or 33' in a single piece with the outer frame 32 or 32' and projecting radially outwards from this latter, this flange 33 or 33' being fixed against the corresponding double horn 34 or 34' by axial screws passing through aligned axial drillings in these two parts, like the drillings 33a in FIG. 6.

In this example, the double horns 34 and 34' are also arched, in a plane perpendicular to the axis X—X, so as to have their concavity turned towards this axis X—X; and these parts are also of substantially U transverse section and ended by lateral ends forming the mounting brackets 35 and 36 or 35' and 36', which come in opposite pairs on the sides of the half-bearings 29 and 29'.

A notable difference relative to the example of FIGS. 3 to 5 is that one 37 of the struts, shown in broken lines in FIG. 6, is clearly an independent part placed between the end mounting brackets 35 and 35' of the double horns 34 and 34', but the other strut 38 is in a single piece with one of the double horns 34 and 34', and more precisely the double horn 34' in this example, which the strut 38 extends from one side in its concave shape. It then results that the corresponding end mounting bracket 36' is in fact at the upper end, in FIG. 7, of the strut 38, which is also in a single piece with the pitch lever 22', having substantially the same structure and the same orientation as in the previous example.

Thus, one of the double horns 34', one of the struts 38 and the pitch lever 22' are in a single piece.

As a variant, the strut 37 of FIG. 6 can be, in the same conditions, in a single piece with either the double horn 34' or the double horn 34. In the first case, the double horn 34' is in a single piece not only with the pitch lever 22' but with the two struts 38 and 37, which extend it on its two sides, and in the second case, each of the struts 37 and 38 is in a single piece with respectively one of the double horns 34 and 34'.

The calibrated pre-compression of the spherical laminated and concentric half-bearings 29 and 29' is ensured in the same way as in the first example of FIGS. 3 to 5, by threaded spindles perpendicular to the large faces of the strip 4 and which clamp the opposite lateral ends 35 and 35' or 36 and 36' of the double horns 34 and 34' one towards the other and against an interposed strut such as 37, or directly one against the other in the case where the strut such as 38 is in a single piece with one of the double horns 34 and 34'. These threaded spindles pass through, as in the first example, aligned drillings or bores such as 39 and 40 in FIGS. 6 and 7, in the ends of the double horns 34 and 34' and in the struts such as 37.

In this example also, a de-coupling is ensured between the pre-compression function of the half-bearings 29 and 29' and the take up operation of the pitch moment of a blade through the fact that the axial screws fixing the outer rigid frames 32 and 32' by their flanges 33 and 33' against the double horns 34 and 34' are removable fixing means and distinct from the threaded spindles for clamping the ends of the double horns 34 and 34' one against the other and/or against the struts, these threaded spindles being perpendicular to the aforementioned axial screws. These axial screws can simultaneously be used to fix the double horns 34 and 34' against the flanges 8 of the oversleeves 3 of the blades 1, by means of the axial drillings such as 41 in FIG. 7 passing through the double horns 34 and 34'.

It can be noted that the two previously described mounting examples include a limited number of parts, and allow an optimal sizing of the laminated half-bearings, the central part of each of which is not removed. These half-bearings as well as the double horns and the struts remain easily accessible on the faces of the flanges 8 from the side of the hub and can be mounted and dismantled without particular tooling allowing, during mounting, a significant and calibrated compression pre-stress of the laminated half-bearings to be ensured, which guarantees a long life span to the latter.

The rotor of FIGS. 1 and 2 is a two blade rear rotor, but could also be a rotor with four blades, constituted from two sets of two blades such as that shown in FIGS. 1 and 2 and superposed by their central part 5 of the strips 4 and their hub core 6 so as to form an X rear rotor, the superposed parts being indeed fixed to each other to form the rotor hub, which can be integral with an end of a rotor shaft, or still pivoting mounted as a swivel arm in an end clevis of this rotor shaft, in the case of a two blade or four blade rotor.

In the case of a rigid connection between the hub core(s) 6 and the rotor shaft, the latter and the core(s) 6 can be passed through by aligned bores coaxial around the axis Z—Z and of sufficiently significant diameter for the sliding passage of a control spindle of the collective pitch of the blades, this spindle supporting, at its end of the side opposite the rotor shaft, a transverse plate rotated with the rotor and connected by a pitch rod to the pitch lever of each of the rotor blades, according to a known arrangement.

Indeed, the collective pitch control of the blades can also be ensured through the outside of the rotor shaft and the hub.

What is claimed is:

1. A rotor of the so-called "hingeless" type for a rotor aircraft, including:

a hub, intended to be rotated around a rotor axis, and at least two blades, each of which is, on the one hand, connected to the hub by a root part including at least one strip torsionable around a longitudinal pitch change axis of the blade, and flexible at least in flapping in a direction substantially perpendicular to the pitch axis and substantially parallel to the rotor axis, and, on the other hand, is provided with a torsionally rigid blade root oversleeve, which is torsionally integral with the blade and the torsionable strip around the pitch axis, on the side of the outer axial part of the oversleeve relatives to the hub and along the pitch axis, whereas the inner axial part of the oversleeve surrounds the strip without contact, to which the oversleeve is connected by two laminated, spherical support half-bearings, substantially concentric on the pitch axis, and each comprising a stack of alternatively rigid and elastomer sphere portions between two rigid frames, one of which is an inner radial frame, relative to the pitch axis, held supported against one face of the strip, and the other of which is an outer radial frame fixed to the oversleeve, which supports a pitch lever projecting outwards from the oversleeve, wherein each of the two rigid outer frames is integral with respectively one of two rigid double horns extending transversely to the strip on both sides of the strip and the half-bearings, and, so that the ends facing one another on the two double horns, on each side of the strip and the two half bearings, are compressed towards each other and against one of respectively two struts placed between said facing ends of said double horns, so as to ensure a calibrated compression pre-stress of the laminated half bearings.

2. A rotor according to claim 1, wherein the compression of the two double horns is ensured by means of removable threaded fixing spindles engaged in aligned bores passing through the struts and the facing ends of the double horns along a direction substantially perpendicular to the strip.

3. A rotor according to claim 1, wherein one at least of the double horns is arched in a plane transverse to the pitch axis and has its concavity turned towards the pitch axis.

4. A rotor according to claim 1, wherein one of the struts is integral with the pitch lever.

5. A rotor according to claim 4, wherein the pitch lever also projects towards the hub substantially parallel to the pitch axis.

6. A rotor according to claim 1, wherein one at least of the struts is integral with one of the double horns.

7. A rotor according to claim 1, wherein each of the two struts is integral with respectively one of the two double horns.

8. A rotor according to claim 1, wherein one at least of the rigid outer frames is fixed against the corresponding double horn by removable fixing means distinct from the means of compressing the double horns one towards the other and against the struts.

9. A rotor according to claim 8, wherein the fixing of at least one rigid outer frame onto the corresponding double horn is ensured with the help of fixing means substantially parallel to the pitch axis.

10. A rotor according to claim 8, wherein the fixing of at least one double horn against a rigid flange of the internal axial end of an oversleeve is ensured with the help of fixing means substantially parallel to the pitch axis.

11. A rotor according to claim 1, wherein one at least of the rigid outer frames is in a single piece with the corresponding double horn.

12. A rotor according to claim 1, wherein one at least of the struts comprises at least one substantially radial flange, relative to the pitch axis, for fixing to a rigid flange of the internal axial end of the oversleeve by removable fixing means, substantially parallel to the pitch axis.

13. A rotor according to claim 1, wherein each inner rigid frame comprises at least one centering stud projecting towards the pitch axis and being housed in a corresponding bore in the opposite face of the strip, in order to install the half bearings held by their inner frame supported against the strip.

14. A rotor according to claim 1, the blades of which are arranged in at least one pair of opposite blades with a common root strip extending from one blade into the other, wherein, for each opposite pair of blades, a core rigid with the hub is fitted between two strip halves separated from each other in a strip part extending on either side of the rotor axis, between the half bearings of the two opposite blades.

* * * * *